No. 806,092. PATENTED DEC. 5, 1905.
P. ATWOOD.
CULTIVATOR SHOVEL OR WEEDER.
APPLICATION FILED JULY 19, 1905.
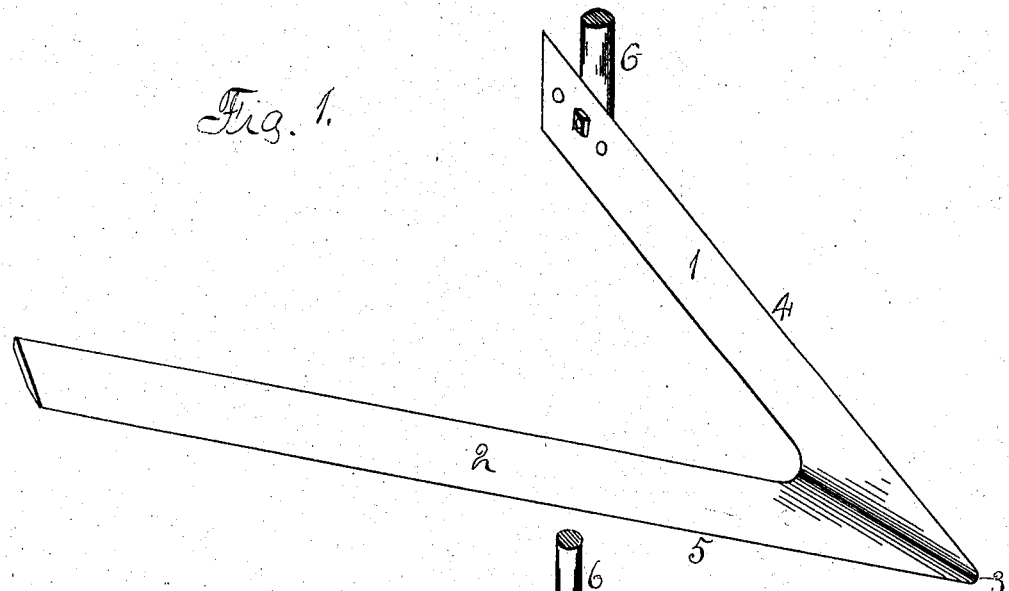
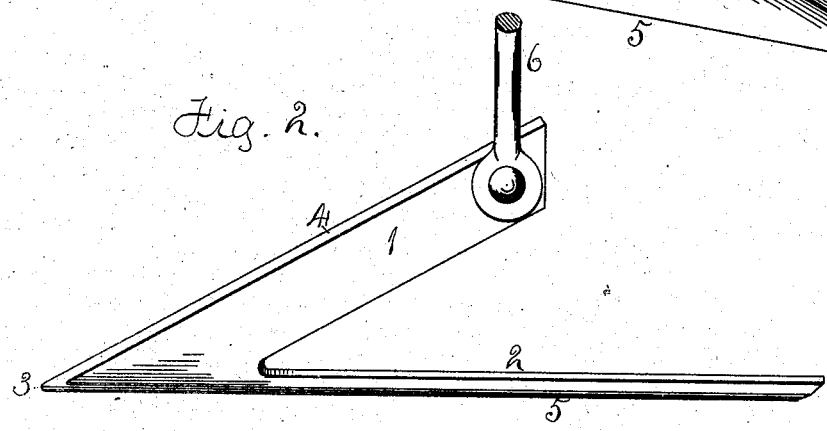
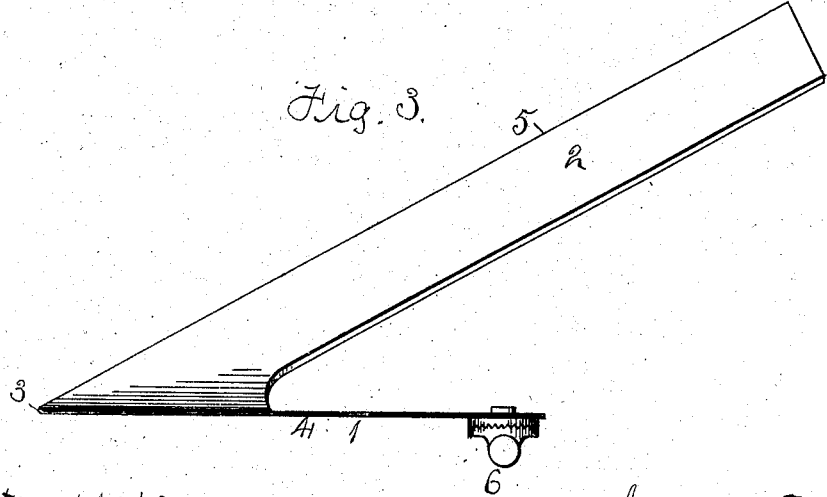
Witnesses:
J. Hulme
Wm E. Griggs
Inventor:
Philip Atwood
By A. O. Behel
Atty.

UNITED STATES PATENT OFFICE.

PHILIP ATWOOD, OF OWEN, ILLINOIS.

CULTIVATOR SHOVEL OR WEEDER.

No. 806,092.     Specification of Letters Patent.     Patented Dec. 5, 1905.

Application filed July 19, 1905. Serial No. 270,435.

*To all whom it may concern:*

Be it known that I, PHILIP ATWOOD, a citizen of the United States, residing at Owen, in the county of Winnebago and State of Illinois, have invented certain new and useful Improvements in Cultivator Shovels or Weeders, of which the following is a specification.

The object of this invention is to construct a shovel or weeder for cultivators having a substantially vertical cutting edge and a substantially horizontal cutting edge, the space between the cutting edges being open in order that the roots of the weeds may be cut without disturbing the ground to any great extent.

In the accompanying drawings, Figure 1 shows isometrical representations of my improved shovel or weeder. Fig. 2 is an elevation. Fig. 3 is a plan view.

My improved shovel or weeder is formed from sheet material. The two sections 1 and 2 are bent at substantially right angles to each other, leaving the space between them open. The section 1 stands in substantially a vertical plane and inclines rearwardly and upwardly from the point 3. Its upper edge 4 is sharpened. The section 2 is located in substantially a horizontal plane and inclines rearwardly and outwardly from the point 3. Its forward edge 5 is sharpened. To the rear upper end of the section 1 is connected a standard 6 in a manner to permit the adjustment to properly present the weeder to the ground. The standard 6 is connected to the beam of a cultivator in any suitable manner, and four such weeders will take the place of the four shovels of a cultivator.

The vertical section of the weeder is designed to cut the weeds above the ground and acts further to protect the standing corn. The horizontal section runs just beneath the surface of the ground and will cut the roots of the weeds and vines. The rear edge of the horizontal section is slightly elevated above the front edge, which will permit the ground to become broken as it falls from the rear edge, and the tops of the weeds and vines will become dislodged from the ground.

By the adjustable connection between the weeder and its standard the angle at which the vertical section stands with respect to the ground may be changed, and the elevation of the rear edge of the horizontal section above its front edge will also be varied.

I claim as my invention—

1. A cultivator shovel or weeder comprising two sections located at substantially right angles to each other, in use, one section located in substantially a vertical plane, and inclining rearwardly and upwardly from its point and having its upper edge sharpened, and the other section located in substantially a horizontal plane and extending rearwardly and outwardly from the point and having its front edge sharpened, the space between the sections being open.

2. A cultivator shovel or weeder comprising two sections located at substantially right angles to each other, in use, one section located in substantially a vertical plane and inclined rearwardly and upwardly from its point and having its upper edge sharpened, and the other section located in substantially a horizontal plane and extending rearwardly and outwardly from the point and having its front edge sharpened, the rear edge of the horizontal section being elevated above its front edge, the space between the sections being open.

3. A cultivator shovel or weeder comprising two sections located at substantially right angles to each other, in use, one section located in substantially a vertical plane and inclined rearwardly and upwardly from its point and having its upper edge sharpened, the other section located in substantially a horizontal plane and extending rearwardly and outwardly from the point and having its front edge sharpened, and means for supporting the shovel or weeder connected to the rear portion of the vertical section, the space between the sections being open.

PHILIP ATWOOD.

Witnesses:
J. HUHNE,
A. O. BEHEL.